Figure 1:
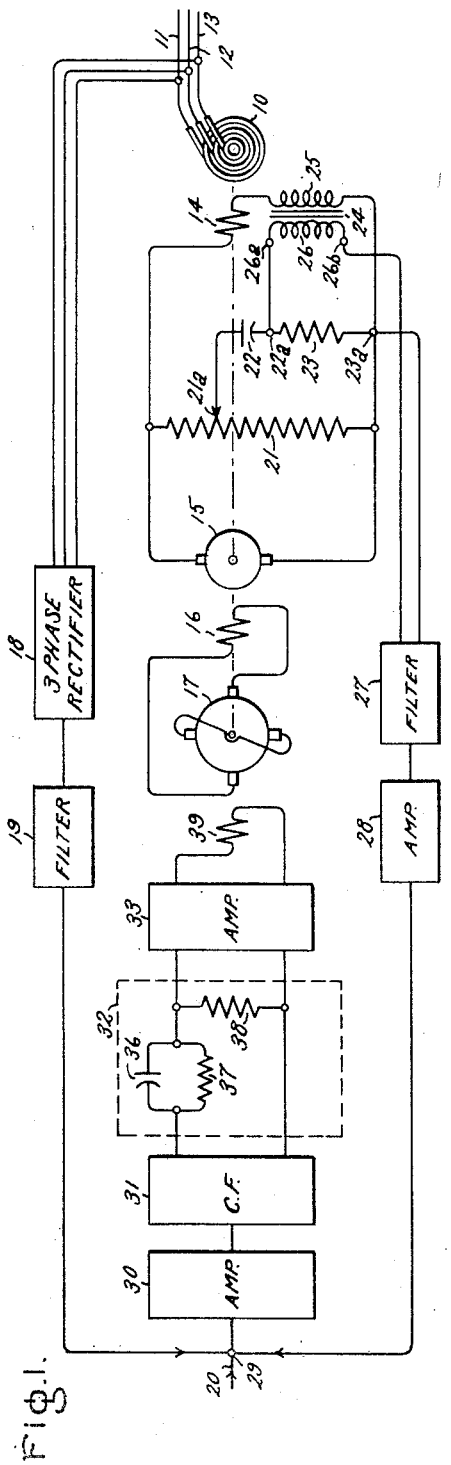

Oct. 26, 1954     G. KRON     2,692,967
REGULATING SYSTEM FOR DYNAMOELECTRIC MACHINES
Filed Feb. 8, 1952     5 Sheets-Sheet 1

Inventor:
Gabriel Kron,
by    *Chandler N. Hitt*
His Attorney.

Oct. 26, 1954     G. KRON     2,692,967
REGULATING SYSTEM FOR DYNAMOELECTRIC MACHINES
Filed Feb. 8, 1952     5 Sheets-Sheet 2

Fig.2A.

Inventor:
Gabriel Kron,
by *Claude A. [illegible]*
His Attorney.

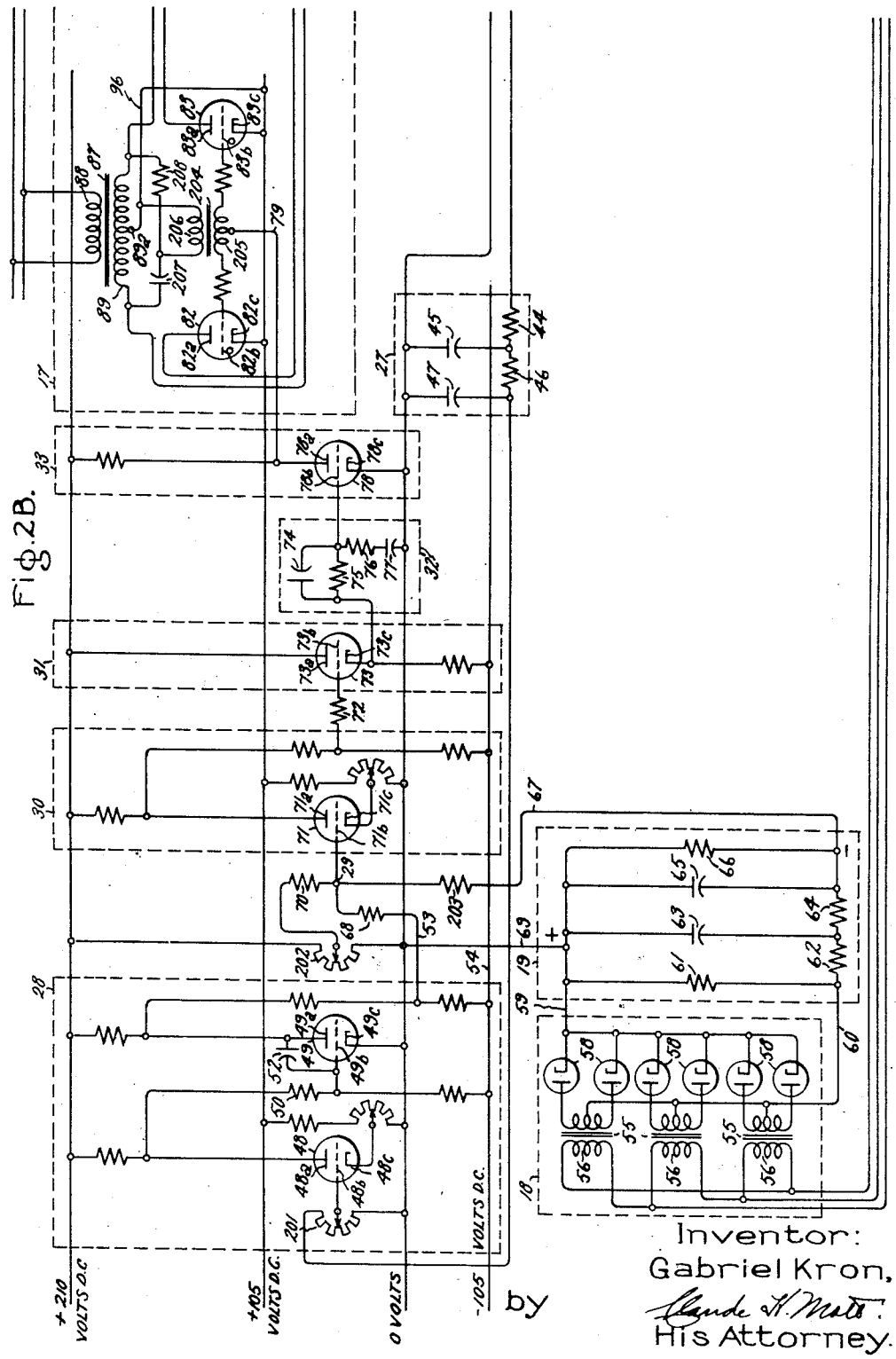

Oct. 26, 1954   G. KRON   2,692,967
REGULATING SYSTEM FOR DYNAMOELECTRIC MACHINES
Filed Feb. 8, 1952   5 Sheets-Sheet 4

Inventor:
Gabriel Kron,
by
His Attorney.

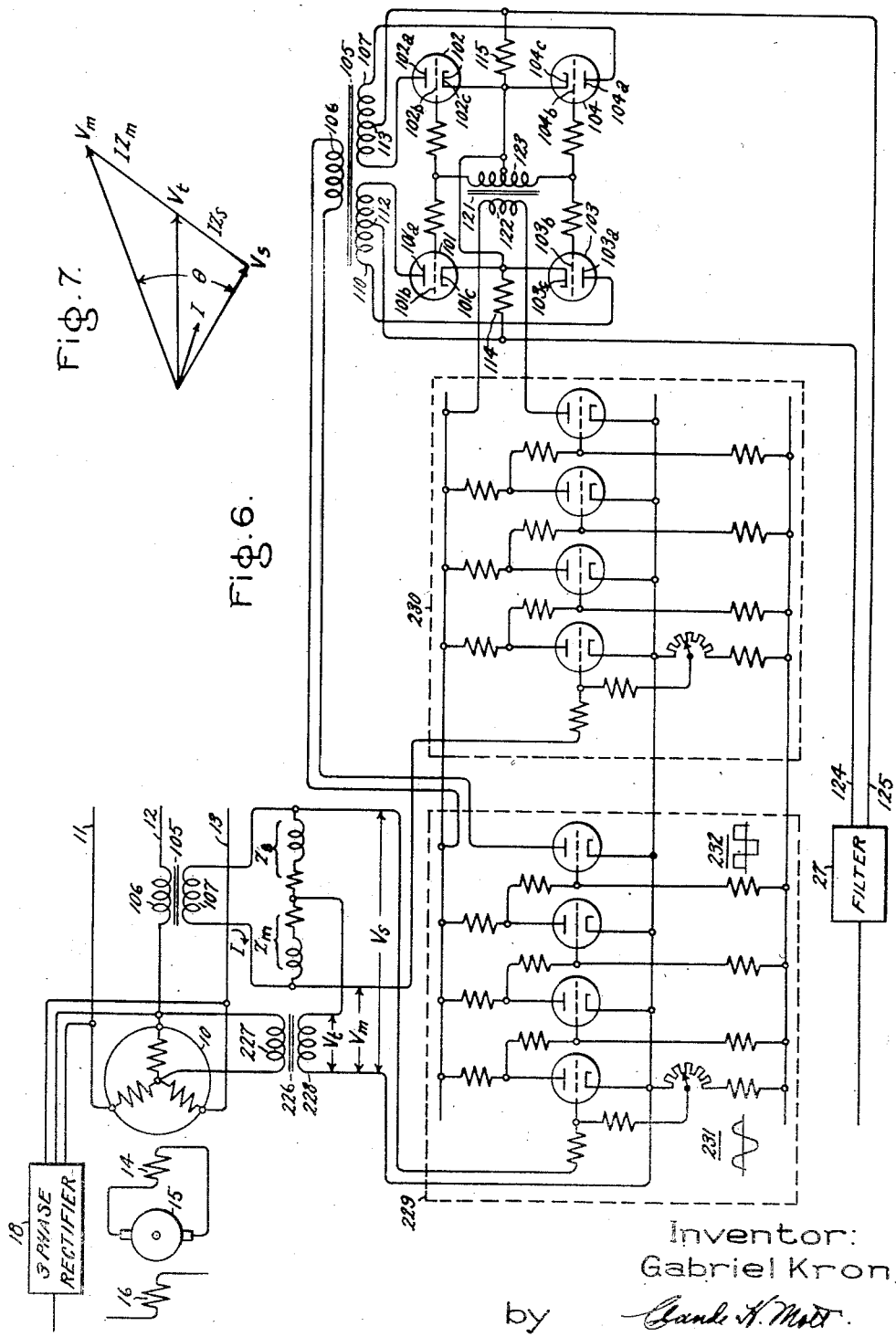

Patented Oct. 26, 1954

2,692,967

UNITED STATES PATENT OFFICE 2,692,967

REGULATING SYSTEM FOR DYNAMO-ELECTRIC MACHINES

Gabriel Kron, Schenectady, N. Y., assignor to General Electric Company, a corporation of New York Application February 8, 1952, Serial No. 270,713

36 Claims. (Cl. 322—24)

This invention relates to regulating systems for dynamoelectric machines, and more particularly to voltage regulating systems which increase the load stability of synchronous dynamoelectric machines and the electric power systems to which such machines are connected. My invention is useful particularly for regulating synchronous alternating current generators which are connected to transmit power over long transmission lines, but it is adaptable for other dynamoelectric machines such as synchronous motors and synchronous condensers.

Electric power transmission systems have two generally recognized stability load limits which may be referred to respectively as "steady state" and "transient." The steady state stability limit is the maximum amount of load which a system can carry under steady state conditions of gradually varying load without causing instability or loss of synchronism between synchronous machines at separated locations on the system. The transient stability limit is the maximum amount of load which the system can carry without causing instability or loss of synchronism of the machines under conditions of large disturbances in the transmission system such as are caused by short circuits, suddenly applied loads, and the like.

When a synchronous generator delivers energy to a load through the medium of a transmission line, the generator rotor is continually subjected to small disturbances because the load continually varies. When the load is relatively small in comparison with the load carrying ability of the generator, these disturbances cause no difficulty. As the load, i. e., the power delivered over the transmission line, increases beyond a certain limit, these small disturbances result in oscillations which increase in magnitude and the generator loses synchronism with the remainder of the system. This is the steady state stability limit. If a generator is connected to a large power system by a 600 mile transmission line, for example, this limit when no generator voltage regulator is provided may be approximately 66% of the maximum load capability of the synchronous generator. The corresponding transient stability limit without a voltage regulator may be approximately 46% of the maximum load capability of the synchronous generator.

It is known that these limits can be increased by the utilization of a conventional voltage regulator in connection with the generator. For example, if a continuously acting type voltage regulator is used, the steady state limit may become approximately 83% and the transient limit may become approximately 73% of the generator capability. These limits may be further increased by decreasing the transient reactance of the generator, and they may be increased still further by reducing the time lags in the voltage regulator.

The present invention, however, provides substantially higher steady state and transient stability limits than are obtainable by the use of any or all of the previously known arrangements. These may be, for example, approximately 96% for the steady state limit and 91% for the transient limit, under conditions the same as those for the percentage values given in the preceding two paragraphs.

Numerous arrangements have been proposed for increasing the stability limits of transmission lines and the generators connected to such transmission lines, including generator armature current regulators, stabilizers involving shunt reactors which draw a controllable current flow from the line at the sending end, changing the field structures of the generators, and the compensation of transmission line inductance and capacitance by means of capacitors and reactors arranged at intervals along the line. The use of capacitors and reactors to compensate for the line reactances, or the use of capacitors only, produces satisfactory results, but this method is costly for very long high voltage lines. Some gain may be made by the use of rotating synchronous condensers instead of static capacitors at intervals along the transmission line.

It will be readily apparent that it would be much more convenient and economical to secure increased stability limits by variation of the excitation of the generator or generators supplying the transmission line, because the amounts of energy involved are small and the location is generally convenient. As was mentioned previously, progress has already been made in this direction, especially by the use of various types of continuously acting voltage regulators employing electronic exciters, saturable core reactors, rotating amplifiers and other devices which increase the stability limits above those which would prevail without such regulators. Other arrangements which have been used and proposed include a series exciter in the field circuit of the generator and an angle regulator which varies the machine excitation voltage in response to changes in the angle between the rotor interpole axis and the effective system voltage so as to restore an initially set angle.

The principal object of this invention is to provide an improved voltage regulating system for a synchronous machine connected to an electric power system, which increases the steady state and transient stability limits of the machine to values which are more nearly equal to the maximum load capability of the machine than has been possible with any previous machine voltage regulating system.

This desired result is obtained by controlling the machine excitation jointly in response to variations in the machine armature voltage and in accordance with rotational transient movements of the machine rotor produced by changes in the electrical load supplied by the electric power system. The excitation of the machine may be controlled in response to variations in a number of different mechanical and electrical characteristics of the machine responsive to transient movements of the machine rotor in order to effect the desired regulation of the machine voltage and the maintenance of load stability of the machine.

A feature of my invention is the use in a machine voltage regulator of phase advancing means to cause the excitation of the machine to change at a faster rate than the armature voltage changes which produce the changes in the excitation.

Other objects, features and advantages of the invention will be apparent from the subsequent detailed description of certain preferred embodiments of the invention, while the scope of the invention is defined in the appended claims.

In a preferred form of the invention, I provide a voltage regulating system for a synchronous generator which includes means for comparing a direct voltage responsive to the armature voltage of the generator and a reference direct voltage in order to produce a regulating signal voltage responsive to the difference between these two voltages. This regulating signal voltage is passed through a phase advancing network, after which it is utilized to control the excitation of an exciter which in turn controls the excitation of the generator. Before being applied to the phase advancing network, however, the regulating signal is modified by another direct signal voltage which is responsive to a rotational transient condition of the generator rotor; in certain preferred forms of my invention, this stabilizing signal is derived from the generator excitation circuit.

For a clearer and more complete understanding of the invention, reference should be had to the accompanying drawing, in which: Fig. 1 shows a regulating system for a dynamoelectric machine embodying one form of my invention; Figs. 2A and 2B illustrate portions of the system of Fig. 1 in greater detail, and also show a modified form of some of the components; Figs. 3, 4, 5 and 6 are partial schematic diagrams illustrating portions of still other embodiments of the invention, specifically other arrangements for obtaining a stabilizing signal responsive to transitory movements of the generator rotor; and Fig. 7 is a vector diagram illustrating the operation of Fig. 6.

Referring to Fig. 1 of the drawing, which in part is symbolic and in part illustrates actual circuits and connections (the symbolic parts being shown in detail in Figs. 2A and 2B), I have shown a preferred form of my invention as applied to the regulation of the armature voltage and load stability of a dynamoelectric machine 10, shown as a 3-phase synchronous alternating current generator, having three armature terminal conductors 11, 12 and 13 which connect the machine 10 for operation in an electrical power system (not shown).

While a conventional symbol has been used in Fig. 1 which indicates that the armature windings of the generator are on the rotor, i. e., the rotating part of the generator, it will be understood that the armature windings usually are located on the stator or stationary portion of the generator in actual practice, particularly with generators of large size. Thus, the armature windings of the machine in which electromotive forces are generated, together with the magnetizable core structure therefor, are ordinarily fixed as a portion of the stator, while the excitation portion of the machine, including the excitation windings and magnetizable core structure therefor, rotates as a portion of the rotor. However, where reference is made hereinafter to armature voltage, it should be understood that a voltage derived from the generated electromotive force of the machine is intended whether the armature be fixed or rotating.

The excitation windings or excitation circuit of generator 10 is illustrated diagrammatically by a field winding 14 (ordinarily located on the rotor in accordance with the preceding paragraph) which is connected to be energized in this typical example by a rotating exciter 15. As shown, this exciter is mechanically direct connected to the generator 10, however, it will be understood that other conventional excitation arrangements may be utilized such as a separately driven exciter or a static exciter of the electronic or magnetic amplifier type.

As shown in Fig. 1, the exciter 15 has an excitation winding 16 energized by a second or pilot exciter 17 which may also take various forms. As illustrated, it is a rotating exciter of the amplidyne, or compensated cross-armature reaction excited type, mechanically direct connected to the exciter 15.

To provide a direct voltage signal which is responsive to the generator armature voltage to be regulated, a three phase full wave rectifier which is designated by the numeral 18 may be used. This rectifier is connected to the three armature conductors 11, 12 and 13 and provides a unidirectional output voltage which is proportional to the average of the three phase voltages of generator 10. The output of rectifier 18 may be passed through a filter 19 in order partially to eliminate the ripples from the voltage and the current waves. Thereafter the output voltage of rectifier 18 is compared with a greater reference voltage which is indicated diagrammatically at 20 and which is preferably a constant unidirectional voltage. The difference between the voltage derived from the generator armature terminal conductors through the rectifier 18 and the reference voltage is utilized, after modification as explained hereinafter, as the electrical regulating signal for actuating the remainder of the regulating system.

For deriving a stabilizing voltage signal responsive to transient angular movements of the generator rotor, I employ in this form of the invention a network associated with the excitation circuit of the generator which comprises an adjustable potentiometer resistor 21, a capacitor 22, a fixed resistor 23, and a transformer 24 having a primary winding 25 and a secondary winding 26. As shown, potentiometer resistor 21 is connected across the armature conductors of exciter 15 so that the excitation voltage of generator 10 is impressed on this potentiometer. The primary winding 25 of transformer 24 is connected in series with the excitation winding 14 of generator 10. Resistor 23 and capacitor 22 are serially connected to the slider 21a of potentiometer 21 so that they are in shunt with a portion of this potentiometer, while the junction point 22a of capacitor 22 and resistor 23 is connected to one terminal 26a of the secondary transformer winding 26. The resulting voltage signal, which appears between the other terminal 26b of secondary winding 26 and the junction 23a between resistor 23 and the main excitation circuit, is responsive to the combination of the time rate of change of the excitation current and the time rate of change of the excitation voltage of the generator.

The two voltage components making up this combination voltage signal are derived respectively from current transformer 24 and potentiometer 21. Since the primary winding 25 of the current transformer is connected in a direct current circuit, it will be understood that the voltage output of the secondary winding 26 of this transformer will be zero under steady state conditions. A change in current through primary winding 25, however, produces a secondary voltage which is approximately proportional to the rate of change of current in the primary winding.

The component of the combined stabilizing signal voltage which is responsive to the rate of change of excitation voltage is derived from potentiometer 21. Under steady state conditions no current flows through the circuit which includes capacitor 22 and resistor 23. When a change in excitation occurs, however, a signal is transmitted through this circuit which is approximately proportional to the rate of change of the excitation voltage, this being accomplished by making the time constant of the combination of capacitor 22 and resistor 23 less than the period of change in excitation corresponding to the natural oscillation frequency of the generator rotor. This natural oscillation or hunting frequency is discussed further hereinafter.

The combined signal voltage, derived from the generator excitation circuit, may be passed through a filter 27, if desired, to smooth out ripples therein and remove undesired components therefrom, after which it may be amplified by an amplifier 28 of the electronic or magnetic type. Thereafter, this stabilizing signal voltage is combined at junction 29 with the previously derived regulating signal voltage responsive to the generator terminal voltage in order to modify the later signal voltage.

This modified regulating signal voltage may be further amplified by means of an amplifier 30 and thereafter passed through an impedance matching stage 31 which may, for example, comprise a cathode follower arrangement in order to match the impedances of the preceding and succeeding portions of the system.

Following the impedance matching stage 31, the modified regulating signal voltage is further modified by being applied to a phase advancing stage 32. As shown, this stage comprises a parallel combination of a capacitor 36 and a resistor 37 connected in series with the incoming signal together with a second resistor 38 connected in shunt with the incoming signal. This network has operated satisfactorily; however, other networks are also known which impart a leading characteristic to an electrical signal for the critical system oscillation frequencies, and which may be substituted for the phase advancing network illustrated if desired. Another such network is illustrated in Fig. 2 of the accompanying drawing.

After being further modified by the phase advancing network 32, the regulating signal may be again amplified if desired by means of an amplifier 33, after which it is utilized to actuate pilot exciter 17 by energizing the control field winding 39 thereof.

In the operation of the regulating system shown in Fig. 1, a first electrical voltage signal responsive to the generator armature voltage is derived by comparing a reference voltage with a voltage signal derived from the three terminal conductors of the generator through a feedback loop which includes rectifier 18 and filter 19. A second electrical voltage signal having two components is derived from the generator excitation circuit by means of devices 21–24 inclusive. As mentioned previously, one of these components is approximately proportional to the rate of change of the generator field current while the other is approximately proportional to the rate of change of the generator field voltage. These two components are combined so that the current responsive signal is regenerative and the voltage responsive signal is degenerative with respect to the changes which produce them. The combination of the two components making up the second signal, after being passed through a filter 27 and an amplifier 28, is used to modify the first or regulating signal. The modified regulating signal after being further amplified at stage 30 is applied to the phase advancing network 32, which further modifies the regulating signal.

After further amplification in stage 33, the twice modified regulating signal is utilized to actuate pilot exciter 17 which controls the excitation of exciter 15 by controlling the current in the field winding 16 thereof. Exciter 15 in turn controls the current in field winding 14 of generator 10, and thereby regulates the armature voltage of the generator to maintain this voltage at a predetermined value and, at the same time, provides transient and steady state stability limits which approach closely the maximum load capability of the generator.

It was mentioned above that the two components of the stabilizing signal voltage are combined so that the current responsive signal is regenerative and the voltage responsive signal is degenerative. To facilitate an understanding of this it should be kept in mind that an initial change in the regulating signal, after it leaves junction 29 and passes through lead network 32 and through exciters 17 and 15, produces a change in the excitation current in winding 14 in a predetermined direction. The resulting current signal component produced by transformer 26, when reflected back through filter 27 and amplifier 28, tends to modify the regulating signal voltage at junction 29 in a manner such that it changes the regulating signal in the same direction as the initial change. This would tend to produce a further increase in the excitation current in winding 14, so that the effect is cumulative. The voltage responsive signal component being connected degeneratively, has the opposite effect, i. e., it tends to modify the regulating signal voltage at terminal 29 in a manner such that it opposes the change in regulating signal voltage which produced the initial change in the excitation of generator 10.

The components of lead network 32, i. e., capacitor 36, resistor 37 and resistor 38, are selected and proportioned so that this network introduces sufficient time phase advance in the regulating signal voltage to more than overcome all of the lags in the exciters and other elements of the regulating system. As will be understood by those familiar with such circuits, such a phase advance can be produced only at one frequency or range of frequencies, and in this case a range of frequencies is chosen which includes the natural hunting frequency of the generator rotor, for reasons which are discussed in more detail hereinafter. As is generally known, such circuit elements as exciters and filters particularly, because of their inductive reactance, cause the current in the circuit or system including such elements to lag behind the voltage which produces the current. In the present system, the components of the lead network 32 are preferably chosen so that this lead network advances the signal voltage in phase sufficiently to more than overcome the total of all the lags on the regulating system, thus producing an anticipatory effect for oscillations at the system hunting frequency. In other words, the phase advancing network 32 is so constructed that variations in the current in the excitation winding 14 of the generator 10 lead slightly in time phase the hunting frequency variations in the voltage signal derived from conductors 11, 12 and 13 which produce the said current variations.

It will be understood that a disturbance on a power system supplied by a machine such as generator 10 has an effect on various characteristics of the machine, including the armature voltage and the electrical angular position of the generator rotor with respect to the power system, viz., the load angle. For example, if a heavy load is suddenly applied on the power system, the armature voltage of the generator decreases suddenly. Simultaneously, the rotational position of the generator rotor is advanced with respect to the corresponding electrical rotational position of the power system, thus increasing the angle between them known as the load angle. When a generator supplies energy to another machine or load, the generator rotor and the generated voltage (in the armature) leads the load by an angle known as a load angle, which becomes larger for larger loads and smaller for smaller loads. Such an angle may vary between zero and 90 electrical degrees approximately. When this angle becomes greater than a maximum value, such for example as 60 degrees, the generator loses synchronism with the remainder of the system, in the manner described previously in connection with steady state and transient stability limits. The load angle is discussed in more detail hereinafter in connection with Figs. 6 and 7 of the drawing.

As the regulating system begins to act, under the assumed condition of a suddenly applied load, the armature voltage is increased and the angle between the generator rotor and the system is decreased. Before these two characteristics are again restored to equilibrium, however, the voltage may increase beyond the desired value, and perhaps oscillate briefly about this value before coming to rest. Similarly, the generator rotor will reach an equilibrium at a new angular location at a larger load angle than previously but, before this point of equilibrium is reached, the generator rotor likewise may oscillate about the new position in concert with the armature voltage. Such oscillations in the armature voltage and rotor angular position occur at approximately the natural frequency of oscillation of the generator rotor, and this may for example be approximately 1 cycle per second for a typical large generator.

When oscillations occur as described in the preceding paragraph, the lead network 32 should operate as described previously completely to counteract all of the lags in the excitation circuit. In one typical case employing a rotating main exciter and an electronic pilot exciter, lags were present in the excitation system which totaled approximately 45 electrical degrees. In this case, a phase advancing network 32 was chosen which introduced a phase advance of approximately 65 electrical degrees, thus more than counteracting the lags to the extent of 20 electrical degrees. It is not essential in all cases to more than compensate for the lags in this manner, and thus provide an anticipatory effect, but it is important at least completely to counteract all lags in the system. It will be understood by those skilled in the art that in cases in which only electronic exciters are employed, that much less lag is introduced than with rotating exciters, and that therefore a correspondingly smaller amount of phase advance is required.

In the foregoing explanation of the regulating system, particularly of the phase advancing network, it was assumed that the generator rotor undergoes one or more oscillations after a disturbance before the rotor again reaches an equilibrium position. It is desirable, however, that the regulating system act sufficiently fast that the generator rotor assumes a new equilibrium position after a disturbance without oscillating, preferably without even overshooting the equilibrium position, i. e., passing by such position and then returning again. My regulating system provides such operation for many severe disturbances.

In the operation of the regulating system to limit the effect of the disturbances to merely a displacement of the generator rotor from its normal rotational position and a momentary variation in the armature voltage of the generator, without oscillations, the following explanation of the operation of the phase advancing network 32 is given. The output voltage from network 32 appearing across resistor 38 may be considered as having two components. One of these is directly proportional to the input voltage and appears across resistance 38 due to the current flow through the series circuit comprising resistance 37 and resistance 38. The second component is proportional to the rate of change of the input voltage, and this component appears across resistor 38 due to the series circuit comprising capacitor 36 and resistor 38. As is known, the current through a capacitor leads the voltage which produces it by an angle of 90 electrical degrees. Therefore, by properly proportioning the elements of network 32, the output voltage appearing across resistor 38 can be made to lead in phase the input voltage by angles up to 90 degrees, the exact lead depending upon the magnitude of the component due to capacitor 36.

The effect of the operation of network 32 as described in the preceding paragraph is to cause the generator excitation current to change at a faster rate than the generator armature voltage change which causes the said current change. As stated previously, in many cases of even severe disturbances this, together with the remainder of my system, may cause the generator characteristics to assume new equilibrium positions without oscillation.

In order to facilitate an understanding of my system, its operation following a typical disturbance may be considered. Assume now, for purposes of illustration, that generator 10 has been carrying a relatively large load, and that suddenly it becomes disconnected from the load. This causes an immediate and sharp increase in the armature voltage, which is reflected from terminal conductors 11, 12 and 13 back through rectifier 18 and filter 19 to junction 29. An increase in the voltage in this circuit causes a decrease in the regulating signal leaving junction 29, inasmuch as the regulating signal is the difference between a reference voltage and the voltage derived from the generator armature. This means that a changing voltage (decreasing) is applied to lead network 32 through amplifier and impedance matching stages 30 and 31. The voltage output from phase advancing stage 32 also decreases but at a faster rate than the input voltage, as explained in the preceding paragraphs. This output voltage is applied through amplifier stage 33 and exciters 17 and 15 to the excitation circuit of generator 10, thereby causing a very rapid decrease in the excitation current in winding 14 of the generator. This reduction in excitation current for generator 10 causes elements 21, 22, 23 and 26 of the stabilizing circuit to produce a stabilizing signal. This stabilizing signal is combined with the armature voltage responsive signal at junction 29 after being passed through filter 27 and amplifier 28. This stabilizing signal, comprising a regenerative component and a degenerative component, as explained previously, modifies the regulating signal in such manner as to tend to prevent oscillation of the generator rotor so that in many cases the generator rotor is restored to an equilibrium position and the armature voltage returned to the desired value without oscillation, and in any event produces these results with a minimum of oscillation which is very rapidly damped out.

Another embodiment of my invention is illustrated in the more detailed electrical circuit diagram of Figs. 2A and 2B of the drawing. In these figures, corresponding parts bear the same reference numerals as in Fig. 1. This system is the same as Fig. 1 except for the network associated with the generator excitation circuit for deriving a stabilizing signal and the phase advancing network. In Figs. 2A and 2B, however, typical circuits have been shown for the various elements which are shown in block form in Fig. 1.

In the form of the invention illustrated in Fig. 2A (see sheet 2 of the drawings), the stabilizing signal responsive to a rotor rotational transient condition of the generator is derived from the generator excitation circuit by a network which includes a potentiometer 21, a capacitor 41 and a second potentiometer 40 in shunt with a portion of the first potentiometer, a resistor 42 connected in the excitation circuit between the junctions of the two potentiometers with the main excitation circuit, and a current transformer 24 having its primary winding 25 connected in the main excitation circuit. As in Fig. 1, a signal which is responsive to the rate of change of current in the generator excitation circuit is produced by current transformer 24. In this case, however, potentiometer 21 and resistor 42 are utilized to derive a signal which is responsive to the difference between voltage and current in the excitation circuit, such difference being proportional to the rate of change of flux linkages in the magnetic circuit of the generator.

In this instance, the time constant of capacitor 41 and potentiometer resistor 40 should be large in comparison to the period of the generator rotor natural oscillation frequency or system hunting frequency. For example, if the system hunting frequency is one cycle per second, the time constant of this resistor-capacitor combination should be in the range of 1 to 10 seconds. It has been found that the actual value is not critical within the specified range. With this arrangement, a voltage signal sub-component is produced which is approximately proportional to the generator excitation voltage. The voltage drop across resistor 42 provides another signal sub-component which is approximately proportional to the current in the excitation circuit. The combination of these sub-components provides the complete stabilizing network with a signal component which is approximately proportional to the rate of change of generator field flux.

In operation, this network should be balanced so that no voltage appears between slider 21a of potentiometer 21 and junction point 43 under steady state conditions. When it is thus adjusted, a bridge circuit is provided which is balanced with respect to unidirectional voltages, the lower portion of potentiometer 21 and resistor 42 forming one portion of this bridge while the upper portion of potentiometer 21 and field winding 14 of the generator form the other portion of the bridge. The capacitor 41 blocks the passage of all steady state signals, such as small unbalances due to field resistance changes, from the feedback path to the remainder of the regulator system and passes only transient signals.

The signal component responsive to rate of change of flux linkages derived from potentiometer 21 and resistor 42 together with capacitor 41 and potentiometer 40 is combined with the rate of change of current signal component from transformer 24, the combined signal appearing between junction 43 and terminal 26b of the secondary winding 26 of the transformer. As in Fig. 1, the network is so connected to the balance of the regulator system that the rate of change of current signal component is fed back regeneratively while the rate of change of flux linkages signal component is fed back degeneratively.

As in Fig. 1, the combined stabilizing signal derived from the generator excitation circuit is impressed on a filter 27. In the circuit illustrated in Fig. 2B, this filter comprises two L sections (see sheet 3). A series resistor 44 and a shunt capacitor 45 make up the first L section, while a series resistor 46 and a shunt capacitor 47 make up the second L section.

After being filtered, the stabilizing signal is amplified by amplifier 28 which as illustrated in Fig. 2B is a two-stage proportional amplifier of electron discharge device type including a pair of triode valves 48 and 49. As is usual in equipments of this type, it is necessary to maintain certain portions of the amplifier and the circuits associated with it, and other portions of Fig. 2 as well, at different relative potential levels. Typical levels of +210 volts for the anode potential, −105 volts for the control electrode circuits, and 0 volts for the cathode potential are indicated in Fig. 2B. For some of the tubes shown in this figure it is satisfactory to maintain the cathodes at exactly zero volts by connecting the cathodes directly to the zero potential bus, while in other cases it is desirable for optimum operation to maintain the cathode at a potential slightly greater than zero; for the latter purposes a +105 volt supply is provided with potentiometers being provided to secure adjustable voltages intermediate 0 and 105 volts for such cathodes. It will be understood that these voltage levels are provided by conventional sources, which are not shown in order to simplify the drawing. The heater circuits for cathodes of the two tubes 48 and 49 included in this amplifier stage have also been omitted to avoid complicating the drawing unnecessarily, but such heater circuits would be provided for these tubes as well as for other tubes with heater circuits described later in any conventional manner well known in the art.

The terminal 26b of the current transformer is connected through the filter 27 and a potentiometer 201 to a control electrode 48b of electron discharge device 48, while junction 43 is connected to the cathode 48c of device 48 through the zero potential bus. As will be readily understood by those familiar with amplifiers of this type, the signal from the stabilizing network which is impressed between control electrode 48b and cathode 48c of tube 48 produces an amplified change in the opposite direction in the voltage appearing between the anode 48a and the cathode. For example, a decrease in the potential of control electrode 48b produces an increase in the potential of anode 48a.

The change in potential of anode 48a is transmitted through a voltage dropping resistor 50 to the control electrode 49b of the electron discharge device 49 forming the second stage of the amplifier 23. A change in the potential of control electrode 49b similarly produces an opposite and amplified change in the potential of anode 49a of this tube. Thus an increase in the potential of anode 48a causes an increase in the potential of control electrode 49b and a decrease in the potential of anode 49a. The output voltage of amplifier 23 which appears between a conductor 53 and a reference conductor comprising the zero potential bus, therefore, undergoes an amplified change in the same direction as the change in the input voltage signal to the amplifier, the phase of the signal having been twice inverted in the amplifier. Conductor 53 is connected to junction 29 through a voltage dropping resistor 68.

Although the system will operate satisfactorily without it, I have found that it is advantageous to connect a capacitor 52 between the anode and control electrode of device 49. This arrangement aids materially in filtering out undesirable components from the stabilizing signal being amplified.

Referring next to the feedback loop including rectifier 18 and filter 19, which provides a voltage responsive to the generator terminal voltage, there is illustrated an electron discharge device type six phase rectifier, providing three phase full wave rectification, which is suitable for this purpose. This rectifier includes three transformers 55 each having a primary winding 56 and a secondary winding 57 provided with a mid-tap. Six diode electron discharge devices 58 are connected to the secondaries of these transformers, two of such devices being connected to opposite ends of each transformer secondary winding. It will be understood that this connection provides an output unidirectional voltage, appearing between conductors 59 and 60 which is proportional to the average of the three phase voltages of generator 10.

This output voltage is impressed on filter 19 which includes in the typical circuit illustrated in Fig. 2B a first shunt resistor 61, a first series resistor 62, a first shunt capacitor 63, a second series resistor 64, a second shunt capacitor 65 and a final shunt resistor 66. The filtered voltage signal which appears between a conductor 67 and a conductor 68 connected to the zero voltage bus is combined at junction 29 through a resistor 203 with the amplified stabilizing signal from conductor 53 which is connected to junction 29 through resistor 68. Also, as mentioned in connection with Fig. 1, a reference voltage is connected to junction 29. This reference voltage may conveniently be derived from a potentiometer 202 which is connected between two suitable points in the system at different voltage levels such as 210 volts and zero. A fixed resistor 70 may be connected between the slider of potentiometer 202 and junction 29.

After the two feedback voltages and the reference voltage have been combined at junction 29, the resulting signal may be amplified by means of a single stage electron discharge device amplifier forming amplifier stage 30. This may comprise, for example, an electron discharge device 71 having an anode 71a, a control electrode 71b and a cathode 71c. A change in the potential of control electrode 71b produces an amplified and opposite change in potential of anode 71a.

The anode 71a of amplifier 30 may then be connected through a resistor 72 to the control electrode 73b of triode 73 forming a portion of cathode follower stage 31 for reducing the impedance of amplifier stage 30 to successfully energize a succeeding phase angle modifying network. A change in potential of control electrode 73b produces a change in the same direction in the potential between cathode 73c and a reference, which in this instance is the minus 105 volt supply conductor.

The output of stage 31, as shown in Fig. 2, is applied to a combination phase angle advancing network and phase angle retarding network 32' which in this typical example comprises parallel connected capacitor 74 and resistor 75 connected in series with the incoming signal and serially connected resistor 76 and capacitor 77 connected in shunt with the incoming signal. This is known as an integral-differential network, and for a detailed explanation of its operation reference is made to United States Patent 2,470,099—Hall for Servomechanism, issued May 17, 1949. Suffice to say here that if the various elements of the network are properly chosen it imparts a leading, or phase angle advancing, characteristic for the critical system oscillation frequencies, but also imparts a retarding characteristic at very low frequencies in the frequency spectrum of the network below the system oscillation frequency. While the network 32 of Fig. 1 provides an advancing characteristic at all frequencies, nevertheless, I have found that generally better results are obtained by the use of the network 32' as shown in Fig. 2 because the latter network results in less loss of amplification in the system than the former and improves other characteristics of the regulating system without jeopardizing the stability of the complete regulating system.

As illustrated in Fig. 2B, the output of stage 32' is connected to a single stage amplifier making up amplifier stage 33. This amplifier comprises a triode electron discharge device 78 having an anode 78a, a control electrode 78b to which the incoming signal is applied, and a cathode 78c. A change in the potential of control electrode 78b causes an amplified and opposite change in the potential of anode 78a. The output voltage of amplifier 33 which appears on a conductor 79 is utilized to actuate pilot exciter 17.

It will be noted that there is a phase inversion in amplifier 30 and another phase inversion in amplifier 33 so that the resulting amplified output signal from the latter amplifier stage changes in the same direction as the signal which is initially impressed on stage 30.

In Figs. 2A and 2B pilot exciter 17 is illustrated as the electron discharge device type. The portion of the pilot exciter which is illustrated in Figure 2A comprises a pair of gas filled electron discharge devices 80 and 81, preferably of the thyratron type, which provide a principal source of energization for field winding 16 of rotating main exciter 15. Tubes 80 and 81 are actuated by an additional pair of tubes 82 and 83 (see Fig. 2B) which may also be of the gas filled thyratron type, tubes 82 and 83 preferably being smaller than tubes 80 and 81.

Each of the tubes 80—83 has an anode designated by the identifying numeral for the tube followed by the suffix $a$, a control electrode identified by the tube number followed by the suffix $b$, and a cathode identified by the tube number followed by the suffix $c$. Anode potential for tubes 80 and 81 is supplied by a transformer 84 having a primary winding 85 and a secondary winding 86, the latter winding being provided with a mid-tap 86a and anodes 80a and 81a being connected respectively to opposite ends of this winding. Tubes 82 and 83 are provided with anode potential by a transformer 87 having a primary winding 88 and a secondary winding 89 mid-tapped at 89a to which anodes 82a and 83a are connected by means of circuits which are described in greater detail hereinafter. Both anode transformers may conveniently be energized at conventional voltage and frequency such as 220 volts, 60 cycles, as indicated in Fig. 2.

The control electrode circuit for devices 82 and 83 includes a transformer 204 having a mid-tapped winding 205 and a second winding 206. The ends of the mid-tapped winding 205 are connected respectively, through resistors, to the control electrodes 82b and 83b. Transformer winding 206 is connected between the mid-tap 89a in the anode transformer secondary winding 89 and the junction of a capacitor 207 and a resistor 208 which are serially connected between the ends of winding 89. As will be understood by those skilled in the art this arrangement provides an alternating potential component for the energization of control electrodes 82b and 83b which is shifted in phase from the anode potential applied to anodes 82a and 83a. This alternating component of control electrode potential is superimposed upon a unidirectional component appearing on conductor 79. The combination of these two components controls the flow of current through the anode-cathode circuits of devices 82 and 83 by phase control in a well known manner, the currents in the anode-cathode circuits of these devices being initiated at a point in the alternating voltage cycle directly responsive to variations in the voltage appearing on conductor 79.

To enable tubes 82 and 83 to operate tubes 80 and 81 respectively, the two pairs of tubes are interconnected by a pair of transformers 90 and 93. Transformer 90 has a primary winding 91 and a secondary winding 92 while transformer 93 has a primary winding 94 and a secondary winding 95.

In the operation of this pilot exciter, a variation in the voltage signal from amplifier stage 33 which is impressed on control electrodes 82b and 83b through conductor 79 varies the time during each half cycle at which the tubes 82 and 83 start to conduct current. It will be understood that these tubes conduct current, or "fire," during alternate half cycles, in order to produce full wave operation. An anode-cathode circuit for each of these tubes is completed through the transformer primary winding 91 (or transformer primary winding 94 as the case may be), through half of transformer winding 89 and through a conductor 96 joining the mid-point 89a of transformer winding 89 to the tube cathodes.

When tubes 82 and 83 fire, they produce pulses of current in their anode-cathode circuits which energize respectively control electrodes 80b and 81b of devices 80 and 81 through transformers 90 and 93, the secondaries 92 and 95 of these transformers being maintained at a suitable negative potential, such as minus 45 volts, with respect to the cathodes of tubes 80 and 81 to provide satisfactory operation of the latter tubes. When control electrodes 80b and 81b become sufficiently less negative due to pulses from tubes 82 and 83, tubes 80 and 81 are caused to conduct during a portion of each half cycle, one of the tubes conducting during positive half cycles and the other during negative half cycles in order to provide full wave operation. The time during each half cycle at which one of these tubes starts to conduct depends upon the time of initiation of the respective firing tube, and the portion of a half cycle during which such conduction occurs governs the magnitude of the output current from pilot exciter 17. Therefore, the output current from exciter 17 is dependent upon and directly responsive to the voltage signal which is impressed upon the pilot exciter. The output of pilot exciter 17 appears between a conductor 97 which is connected to the mid-tap 86a of transformer winding 86 and conductor 98 which is connected to the cathodes of devices 80 and 81.

While pilot exciter 17 is shown in Figs. 2A and 2B as a single phase, full wave device in order to simplify the diagram, it has been found that the use of a connection providing a greater number of phases, such as three or six, provides generally superior operation. The use of a greater number of phases provides a more uniform current for the energization of the field of main exciter 15 and, in turn, reduces the amount of filtering necessary in filter 27 in the stabilizing signal feedback loop. In a similar manner, an increased number of phases may be utilized for rectifier 10 in the main feedback loop, if desired, in order to provide a more uniform output current and reduce the filtering required in filter 19.

Pilot exciter 17 provides the principal source of energization for field winding 16 of rotating exciter 15, but in order to shift the linear operating range of pilot exciter 17 and also to make possible the reversal of the excitation of exciter 15 under extreme abnormal conditions of operation, there may be provided a supplementary source of excitation. This may be derived from a suitable source of unidirectional potential, such as 120 volts, for example. Such a source is connected to energize winding 16 in the opposite or negative direction with respect to pilot exciter 17. A reactor 99 and a variable resistor 100 of comparatively large size are preferably connected in series with winding 16 and the auxiliary source of unidirectional potential, this resistor and reactor being of sufficiently large size that only an insignificant portion of the current from pilot exciter 17 will be shunted from the winding 16. Under normal conditions of operation, the output of exciter 17 completely counteracts this auxiliary negative source of excitation and provides a net positive excitation.

It is believed that it will be clear from the foregoing that the operation of the system shown in Figs. 2A and 2B is the same as that of Fig. 1. That is, a first pulsating direct signal voltage signal responsive to the generator armature terminal voltage and derived through rectifier 18 and filter 19 is combined at junction 29 with a reference voltage to provide a regulating signal. This regulating signal voltage is modified by a stabilizing signal derived from the excitation circuit of the generator through filter 27 and amplifier 28, this circuit also being connected to the junction point 29. After amplification and further modification by the phase modifying network, the doubly modified regulating signal is utilized in regulating the terminal voltage of generator 10 by means of the excitation provided by pilot exciter 17 for exciter 15 and by main exciter 15 for generator 10. Tests have shown that this invention, as illustrated in the two forms of Figs. 1 and 2A and 2B, increases both the transient and steady state stability limits of the generator to values close to the full capability of the generator, in addition to regulating the generator voltage to maintain it at a predetermined value.

It is mentioned hereinbefore in connection with the circuit of Figs. 2A and 2B that the component of the stabilizing signal responsive to the rate of change of current is returned regeneratively at junction 29 to the main regulating loop, while the component responsive to the rate of change of flux linkages is applied degeneratively, and this arrangement is preferable. However, I have found that if both of these signal components are reversed, i. e., the rate of change of flux linkages signal component being applied regeneratively and the rate of change of current signal component being applied degeneratively, that satisfactory operation of the regulating system is obtained.

Figure 3:
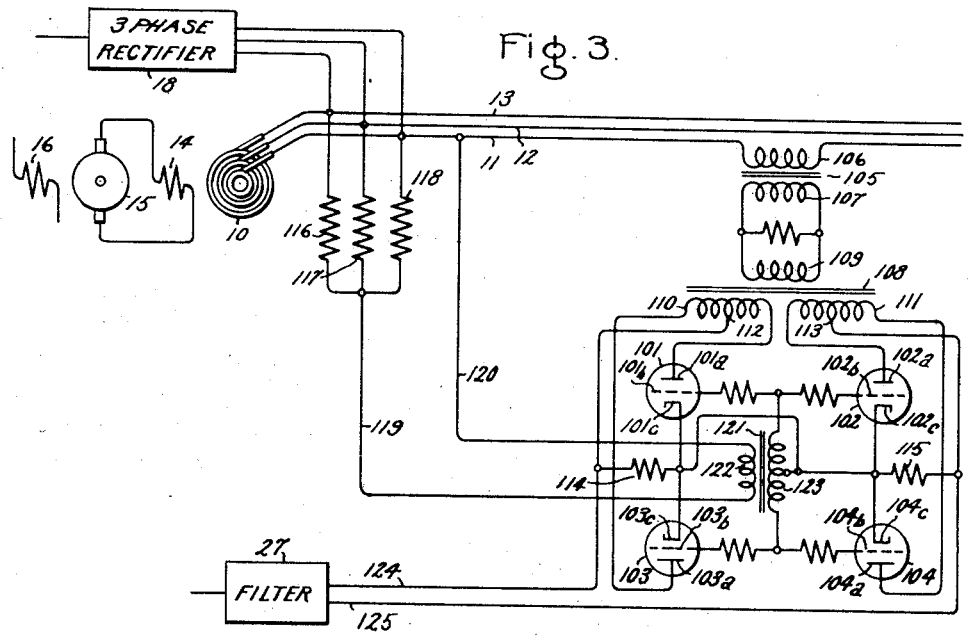

A further embodiment of my invention is illustrated in the partial schematic diagram of Fig. 3 on the accompanying drawing. In this partial embodiment, a stabilizing signal responsive to generator rotor transient movements is derived from the armature circuit of the generator instead of from the excitation circuit of the generator as in Figs. 1 and 2A and 2B. It should be understood that except for this change the complete system of Fig. 3 is otherwise the same as the systems illustrated in Fig. 1 and Figs. 2A and 2B.

In the system illustrated by Fig. 3, a stabilizing signal is utilized which is proportional to the component of generator armature current which is in phase with the generator armature voltage. This generator current component varies in time phase with transient variations in the rotational position of the generator rotor caused by disturbances on the power system.

Such a signal may be derived by the use of the circuit shown in Fig. 3. In this circuit an armature current responsive signal component is derived by means of a current transformer 105 having a primary winding 106 and a secondary winding 107, winding 106 being connected in circuit with one of the generator armature conductors such as conductor 11. To the secondary winding 107 is connected the primary winding 109 of an anode transformer 108. Transformer 108 has two secondary windings 110 and 111 and each of these secondary windings has a mid-tap, these being designated respectively by the numerals 112 and 113.

The secondary winding 110 is utilized to provide anode potential for a pair of triodes 101 and 103, the anodes 101a and 103a respectively of these tubes being connected to opposite ends of winding 110, while the mid-tap 112 of this winding is connected to the cathodes 101c and 103c respectively of these tubes through a common resistor 114. Transformer secondary winding 111 is used in a similar manner to provide anode potential for a pair of triode electron discharge devices 102 and 104, the opposite ends of this winding being connected respectively to anodes 102a and 104a while the mid-tap 113 is connected to the cathodes 102c and 104c through a common resistor 115.

In order to provide an armature voltage responsive signal component for the circuit of Fig. 3, there are provided three resistors 116 and 117 and 118 of preferably identical characteristics which are connected between conductors 11, 12 and 13 respectively and a common conductor 119 in order to isolate the neutral of the three phase system of conductors 11, 12 and 13. The primary winding 122 of a grid transformer 121 is connected between conductor 119 and a second conductor 120 which is joined to conductor 11 of the three phase circuit. The secondary winding 123 of transformer 121 is connected to energize the control electrodes of devices 101—104 through suitable resistors. One end of winding 123 is connected to control electrodes 101b and 102b of tubes 101 and 102 while the opposite end is connected to control electrodes 103b and 104b of tubes 103 and 104. The mid-tap of winding 123 is connected to the cathodes of all four tubes.

In the operation of this circuit, if the power factor of the three phase circuit 11, 12, 13 is unity, the output of the illustrated stabilizing circuit will be a maximum. Under this condition, the anode of one tube, say 101 for example, and the control electrode of this tube both are energized by the positive half of the alternating current wave during coinciding intervals. During the next half cycle, the same thing occurs in tube 103. The net result is the equivalent of full wave rectification, with continuous current flow provided by devices 101 and 103 through resistor 114. Such currents produce additive potential drops across resistor 114 which jointly produce a voltage between a pair of conductors 124 and 125. During such operation, there is no current flow through devices 102 and 104 inasmuch as the energizing potentials of the control electrodes of these tubes are in the negative portion of the alternating current wave while the anodes are in the positive portion. If, however, there is a change in power factor in the three phase line 11, 12, 13, in either direction from unity, the relative phase relation of the anodes and control electrodes in this arrangement will shift with the result that tubes 101 and 103 conduct during only a portion of each half cycle while tubes 102 and 104 conduct and produce opposing potentials across resistor 115 during the balance of each half cycle. The result of this operation is that a voltage signal appears between conductors 124 and 125 which is almost exactly proportional to the in-phase component of the current in the generator output circuit. This stabilizing signal is applied to filter 27 and is thereafter utilized in the same manner as the stabilizing signals of Figs. 1 and 2A and 2B to provide the stabilized voltage regulating system of this invention.

Figure 4:
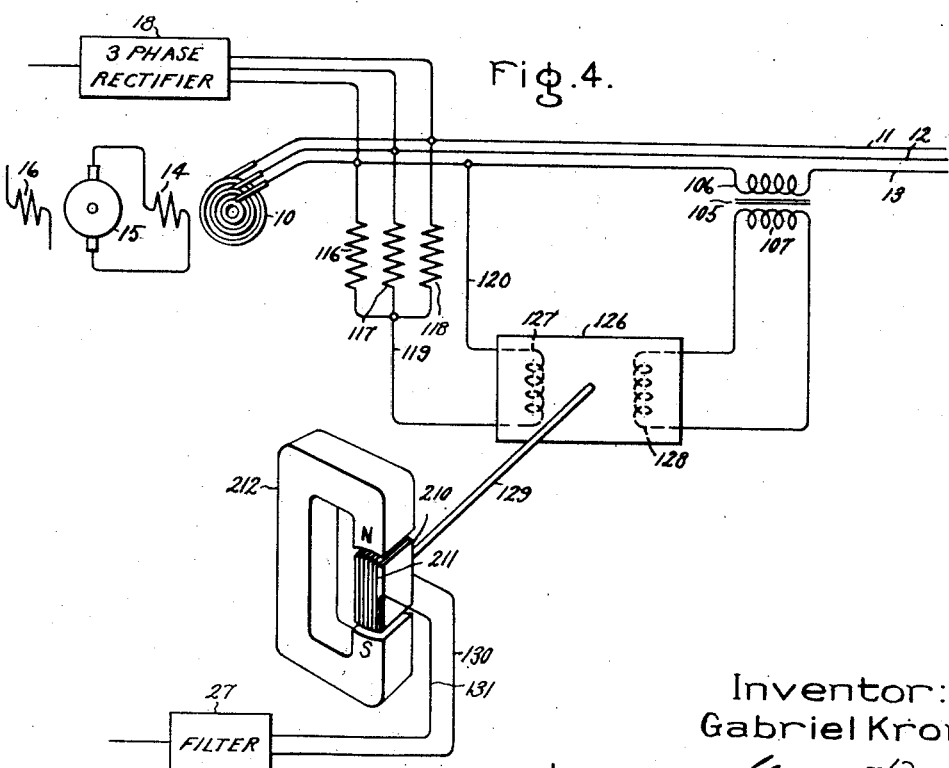

A still further modification of my invention is illustrated in the partial schematic diagram of Fig. 4 which shows symbolically a means of deriving from the armature conductors a stabilizing signal proportional to the rate of change of the power output of generator 10, which change of output produces a transient condition of the generator rotor. As with Fig. 3, it should be understood that the circuit shown in Fig. 4 for deriving a stabilizing signal is utilized with the remainder of a system as shown in Figs. 1 or 2A and 2B to provide a complete voltage regulating system.

In the stabilizing circuit of Fig. 4 there is included a conventional dynamometer type wattmeter device which is designated by the numeral 126. As illustrated, this is a single phase device having a current coil 128 and a potential coil 127. The current coil is energized by means of a current transformer 105 having a primary winding 106 in one of the generator conductors, in this case conductor 13, and a secondary winding 107 connected to current winding 128. The potential coil 127 is energized by the line to neutral voltage appearing between conductors 119 and 120, the arrangement for isolating the neutral and providing this line to neutral voltage being the same as that shown in Fig. 3 and being identified by the same reference numerals as in the latter figure.

The wattmeter device 126, as illustrated, has an extension shaft 129 which is rotated by device 126 an amount proportional to the power output of generator 10. The shaft 129 rotates an armature 210 of magnetizable material having a winding 211 thereon, so that the latter winding cuts lines of flux set up by a permanent magnet 212 having its north and south poles disposed above and below the armature as indicated by the designations "N" and "S." It should be understood that armature 210 is rotated through only a small portion of a complete revolution by the wattmeter device; and through such a small portion of a complete revolution, a voltage is produced between conductors 130 and 131 connected to the opposite ends of winding 211 which is approximately proportional to the rate of change of power output of generator 10. When this power output is not changing shaft 129 and armature 210 are stationary and no voltage appears between conductors 130 and 131, but when the power output of generator 10 is changing a voltage signal results between conductors 130 and 131 which is responsive in magnitude to the rate of change and responsive in polarity to the direction of the change.

The stabilizing signal voltage appearing between conductors 130 and 131 after being passed through filter 27 is utilized in the same manner as the stabilizing signals of the circuits of Figs. 1 or 2A and 2B to provide an improved stabilized regulating system for dynamoelectric machines. It will be apparent to those skilled in the art that other arrangements for providing a voltage signal approximately proportional in magnitude to the rate of change of power output of generator 10 and responsive in polarity or sense to the increase or decrease thereof may be utilized in place of the arrangement illustrated in Fig. 4 without departing from this invention. The filter 27 may not be necessary in the system of Fig. 4 and, in any event, this filter may be relatively small and fast acting when this embodiment of the invention is employed.

Figure 5:
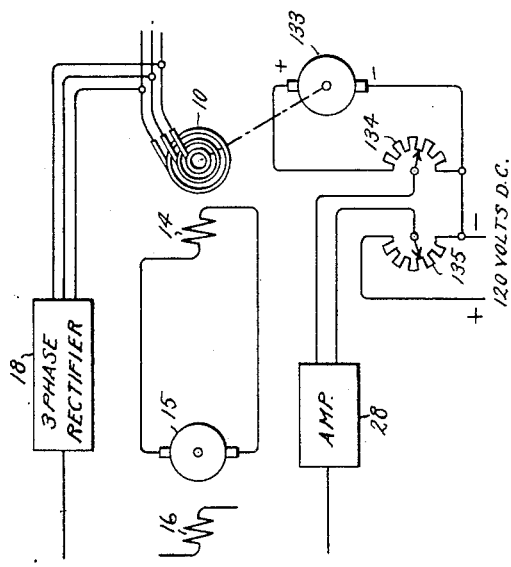

Still another embodiment of my invention is illustrated in the partial schematic diagram of Fig. 5. As in Figs. 3 and 4, the circuit shown in this figure for deriving a stabilizing signal is utilized with the remainder of the system as shown in Figs. 1 or 2A and 2B to provide a complete voltage regulating system.

In Fig. 5, a signal which is responsive to momentary or transient changes in the speed of the rotor of generator 10 is utilized to provide the stabilizing signal. As was mentioned previously, the rotor of a generator delivering energy to a load through the medium of a transmission line is always subject to speed deviations because of continual variations in the load; that is, even though the generator may have an average speed of 3600 r. p. m., for example, for a 60 cycle generator, the instantaneous speed of the rotor under usual conditions varies slightly above and below this value. I have found that it is possible to provide a satisfactory stabilizing signal by sensing these momentary departures in speed above and below the average speed value. Such a stabilizing signal may be derived either mechanically or electrically, and I have shown in Fig. 5 a suitable mechanical arrangement utilizing a tachometer generator connected directly to the shaft of the main generator, while in Fig. 6 there is illustrated an electrical arrangement utilizing signals derived from the generator armature conductors.

In Fig. 5 there is included a tachometer generator 133 directly connected to the rotor of generator 10 and having a unidirectional output current, this current being passed through a potentiometer resistor 134. A second potentiometer 135 is connected for energization by a source of constant unidirectional voltage, such as 120 volts for example, which is preferably approximately the same as the voltage of tachometer 133. The sliders of potentiometers 134 and 135 are connected to amplifier 28 of the complete regulator system as shown in Figs. 1 and 2A and 2B, the filter 27 not being shown in this case, although it may be required in some instances to remove undesired signal components resulting from characteristics of the tachometer. If the sliders of the two potentiometers are adjusted for balance at the normal operating speed of tachometer 133, the arrangement shown will then provide a stabilizing signal voltage which is responsive in magnitude and sense to the deviation of the speed of generator 10 from the average speed. The stabilizing signal voltage appearing between the sliders of the two potentiometers after being amplified in amplifier 28 is utilized in the same manner as the stabilizing signals of the circuits of Figs. 1 and 2A and 2B to provide an improved stabilized regulating system for dynamoelectric machines.

In Fig. 6 there is shown a circuit for deriving electrically a stabilizing voltage signal which is approximately proportional to the change in load angle of a generator resulting from a transient rotational condition of its rotor, which generator is connected to supply energy to a load, this change in load angle being in turn approximately proportional to the angular deviation of the generator rotor from its average position during rotation. The load angle is the angle between the voltage appearing across the external load or system and the internal generated voltage of the machine being regulated. In Fig. 7, there is included a vector diagram in which this load angle is shown as the angle $\theta$ while $V_m$ represents the machine voltage and $V_s$ represents the system voltage. The terminal voltage of the machine $V_t$ is intermediate the machine and system voltages as shown, while the vector diagram is completed by vectors $IZ_m$ and $IZ_s$ representing respectively the voltage drops due to current flowing through the impedance of the machine and the impedance of the system, and the vector I which represents the current.

In order to obtain a signal responsive to the changes in load angle $\theta$, a first signal component is derived by means of a potential transformer 226 having its primary winding 227 connected between the neutral point of the generator and the terminal of line conductor 12. The voltage appearing across the secondary winding 228 of this transformer is proportional to the terminal voltage of the generator and this is indicated by $V_t$ in the schematic connection diagram of Fig. 6. To provide additional voltages to be combined vectorially with the terminal voltage $V_t$, a pair of impedances labeled $Z_m$ and $Z_s$ in Fig. 6 are chosen having impedance values as nearly as possible proportional to the impedances of the machine and of the system respectively. A current proportional to the current being delivered to the load by the machine is circulated through these two impedances by connecting them in series to the secondary winding 107 of a current transformer 105 having its primary winding 106 connected in line 12. With the transformation ratios of transformers 105 and 226 properly chosen, the voltage drops produced by the passage of current I through impedances $Z_m$ and $Z_s$ are respectively added and subtracted vectorially from $V_t$ to produce respectively the voltage vectors $V_m$ and $V_s$ as indicated in Fig. 6. The angle between $V_m$ and $V_s$ and the deviation thereof may then be determined by the remainder of the circuit shown in this figure.

The voltage $V_s$ is impressed upon a conventional electron discharge device amplifier 229 of the type illustrated by the numerals 28, 30 and 33 of Figs. 1 and 2. This amplifier changes a voltage signal having an approximately sinusoidal variation as illustrated by 231 in Fig. 6 to an approximately square wave variation as illustrated by 232 in this figure. As will be readily understood by those familiar with amplifiers of this type, a relatively large number of amplifier stages ultimately produces an approximately square wave regardless of the initial shape of the wave due to saturation and inherent limiting effects beyond the normal linear operating range, and amplifier 229 should have a sufficient number of stages to produce this result. The voltage $V_m$ is applied to an amplifier 230 which is the same as amplifier 229 and ultimately produces a square wave in the same manner. The output square wave voltage signals from amplifiers 229 and 230 are applied to a discriminator circuit which is the same as that illustrated and described in Fig. 3 and bears the same reference numerals for various parts as the circuit in that figure. The output voltage signal from the discriminator circuit appearing on conductors 124 and 125 of Fig. 6 is a unidirectional voltage which varies above and below a predetermined normal value approximately proportionally with changes in the load angle above and below the normal value. This stabilizing signal is then used in the same manner as the stabilizing signal in other embodiments previously described to provide an improved generator voltage regulating system.

While two specific arrangements for deriving speed responsive stabilizing signals have been described and illustrated in Figs. 5 and 6, other speed responsive stabilizing signal arrangements may be used if desired. For example, a stabilizing signal responsive to the difference in momentary speed changes between a generator and another machine comprising a load being supplied by the generator can be utilized if desired.

While generators have been used for illustrative purposes for all of the embodiments of the invention described and illustrated herein, it should be understood that all of these embodiments are applicable also to synchronous motors and synchronous condensers. Any of these embodiments may be used, for example, to regulate the armature voltage of a synchronous condenser located either at an intermediate point on a transmission line or at the receiving end of such a line. When so used, increased system stability results in the same manner as if the regulating system were used on the generator at the sending end of the transmission line.

An example of a synchronous motor for which this invention is useful is a ship propulsion motor. In such a case it is generally desirable to utilize a motor of approximately the same electrical size as the generator, and in addition, it is desirable to keep both the motor and generator as small in physical size as possible. A reduction in physical size generally results in an increase in the reactance of the machines and this, in turn, produces stability problems. The use of this invention in a regulating system for the excitation of the motor greatly reduces the tendency toward instability between such a motor and its generator.

While I have illustrated and described this invention in certain specific forms, it will be understood that modifications of the invention may be made. Other electrical networks may be utilized for deriving a stabilizing signal, and other phase angle modifying networks and other excitation circuit arrangements may be used. Therefore, it should be understood that I intend to cover by the appended claims all such modifications which fall within the true spirit and scope of my invention.

What I claim as new and desire to secure by Letters Patent of the United States is:

1. A system for regulating the voltage and increasing the stability of a dynamoelectric machine having a stator and a rotor and provided with armature and excitation windings comprising a source of constant reference voltage, means for deriving from said armature winding a voltage responsive to variations in the armature voltage of said machine, a voltage comparison circuit responsive to said reference voltage and said derived voltage for producing a regulating signal voltage equal to the difference of said reference and derived voltages, stabilizing signal means responsive to a rotational transient condition of said rotor and connected to said deriving means for modifying said regulating signal voltage, connections for supplying said modified signal voltage to said excitation winding to vary its energization, and a resistance-capacitance lead network included in said connections for causing the current of said excitation winding to vary at a rate faster than that of said variations of said armature voltage.

2. A regulating system for a dynamoelectric machine provided with armature and excitation windings, a source of constant direct reference voltage, means for deriving from said armature winding a direct voltage responsive to variations in the armature voltage of said machine, a voltage comparison circuit responsive to said reference and derived voltages for producing a direct regulating voltage equal to the difference thereof, stabilizing signal means responsive to a rotational transient condition of the rotor of said machine and connected to said deriving means for modifying said direct regulating voltage, connections for supplying said modified direct regulating voltage to said excitation winding to vary the energization thereof, and a resistance-capacitance lead network included in said connections for causing the current in the circuit of said excitation winding to vary at a rate faster than that of said variations of said armature voltage.

3. A regulating system for a dynamoelectric machine comprising, means responsive to the armature voltage of said machine for deriving an electrical regulating signal, means responsive to a rotational transient condition of the rotor of said machine for deriving a stabilizing signal having a regenerative component, means for combining said stabilizing signal and said regulating signal for modifying said regulating signal, means connected to said deriving means for modifying the phase of said modified signal, and means responsive to the last modified signal for varying the excitation of said machine so as to maintain said armature voltage at a predetermined value and maintain the load stability of said machine.

4. A system for regulating the voltage and increasing the stability of a dynamoelectric machine having a stator and a rotor and provided with armature and excitation windings comprising a source of constant reference voltage, means for deriving from said armature winding a voltage responsive to variations in the armature voltage, a voltage comparison circuit responsive to said reference voltage and said derived voltage for producing a regulating signal voltage equal to the difference of said reference and derived voltages, stabilizing signal means responsive to a rotational transient condition of said rotor for deriving a stabilizing signal voltage having a regenerative component and connected to said voltage comparison circuit for modifying said regulating signal voltage, connections for supplying said modified regulating signal voltage to said excitation winding, and a resistance-capacitance lead network included in said connections for causing the current in the circuit of said excitation winding to vary at a rate faster than that of said variations of said armature voltage.

5. A regulating system for a dynamoelectric machine comprising, means responsive to the armature voltage of said machine for deriving an electrical regulating signal, means responsive to a rotational transient condition of the rotor of said machine for deriving a stabilizing signal having a regenerative component, means for combining said stabilizing signal and said regulating signal for modifying said regulating signal, a resistance-capacitance lead network connected to said deriving means for advancing the time phase of said modified signal, and means responsive to the modified signal for varying the excitation of said machine so as to maintain said armature voltage at a predetermined value and maintain the load stability of said machine.

6. A regulating system for a dynamoelectric machine comprising, means responsive to the armature voltage of said machine for deriving an electrical signal, means responsive to the rate of change of the excitation current of said machine for deriving a regenerative signal component, means for combining said component and said signal for modifying said signal, means for modifying the phase of said modified signal, and means responsive to the last modified signal for varying the excitation of said machine so as to maintain said armature voltage at a predetermined value and maintain the load stability of said machine.

7. A system for regulating the voltage and increasing the stability of a dynamoelectric machine having a stator and a rotor and provided with armature and excitation windings, comprising means for deriving from said armature winding a regulating signal responsive to variations in the armature voltage of said machine, means connected to said excitation winding and responsive to the rate of change of the excitation current and the rate of change of the excitation voltage of said machine for deriving respectively regenerative and degenerative signal components, means connected to said deriving means for combining said signal components with said regulating signal for modifying said regulating signal, and means connected to said deriving means for controlling the energization of said excitation winding in response to said modified signal.

8. A regulating system for a dynamoelectric machine comprising, means responsive to the armature voltage of said machine for deriving an electrical signal, stabilizing signal means connected to said deriving means for modifying said signal, said stabilizing signal means including means for deriving a regenerative signal component responsive to the rate of change of the excitation current of said machine and means for deriving a degenerative signal component responsive to the rate of change of the excitation voltage of said machine, means connected to said deriving means for advancing the phase of said modified signal, and means responsive to the last modified signal for varying the excitation of said machine so as to maintain said armature voltage at a predetermined value and maintain the load stability of said machine.

9. A system for regulating the voltage and increasing the stability of a dynamoelectric machine having a stator and a rotor and provided with an armature winding and an excitation winding and a magnetic circuit for these windings, comprising means for deriving from said armature winding a regulating signal responsive to variations in the armature voltage of said machine, stabilizing signal means responsive to a rotational transient condition of said rotor connected for modifying said regulating signal, said stabilizing signal means including means for deriving a regenerative signal component responsive to the rate of change of the excitation current of said machine and means for deriving a degenerative signal component responsive to the rate of change of flux in the magnetic circuit of said machine, and means connected to said deriving means for controlling the energization of said excitation winding in response to said modified signal.

10. A system for regulating the voltage and increasing the stability of a dynamoelectric machine having a stator and a rotor and provided with an armature winding and an excitation winding, comprising means for deriving from said armature winding a regulating signal responsive to variations in the armature voltage of said machine, stabilizing signal means responsive to a rotational transient condition of said rotor connected for modifying said regulating signal, said stabilizing signal means including means for deriving a regenerative signal component responsive to the rate of change of the excitation current of said machine and means for deriving a degenerative signal component responsive to the rate of change of the excitation magnetic flux in said machine, means connected to said deriving means for advancing the time phase of said modified signal, and means connected to said last named means for controlling the energization of said excitation winding in response to said phase advanced signal.

11. A regulating system for a dynamoelectric machine comprising, means for deriving an electrical signal which varies responsively to variations in the armature voltage of said machine, stabilizing means connected to said deriving means for modifying said signal, said stabilizing signal means including means for deriving a regenerative signal component responsive to the rate of change of the excitation current of said machine and a degenerative signal component responsive to the relative difference between the excitation voltage and excitation current of said machine and means connected to said deriving means and responsive to the modified electrical signal for affecting the excitation of said machine.

12. A regulating system for a synchronous dynamoelectric machine which is arranged for interconnection in a power system comprising, means for deriving an electrical signal which varies responsively to variations in the armature voltage of said machine, stabilizing means connected to said deriving means for modifying said signal, said stabilizing signal means including means for deriving a regenerative signal component responsive to the rate of change of the excitation current of said machine and a degenerative signal component responsive to the relative difference between the excitation voltage and excitation current of said machine, frequency responsive network means connected to said deriving means for further modifying said signal, said network means providing a phase advancing characteristic in the range of frequencies including the natural oscillation frequencies of said power system, and means responsive to the phase advanced modified electrical signal for controlling the excitation of said machine.

13. A voltage regulating system for a synchronous dynamoelectric machine comprising, means responsive to the armature voltage of said machine for deriving a first voltage, connections to a source of reference voltage for providing a regulating signal responsive to the difference between said first voltage and said reference voltage, means responsive to a rotor rotational transient condition of said machine for deriving a stabilizing signal including a regenerative component, means for combining said stabilizing signal and said regulating signal for modifying said regulating signal, means comprising a resistance-capacitance network electrically connected to said combining means for advancing the phase of said modified signal, and means responsive to the phase advanced modified signal for varying the excitation of said machine so as to maintain said armature voltage at a predetermined value and maintain the load stability of said machine.

14. A voltage regulating system for a synchronous dynamoelectric machine comprising, means for deriving a voltage which varies directly with variations in the armature voltage of said machine, connections to a source of reference voltage for providing a regulating signal equal to the difference between said first voltage and said reference voltage, stabilizing signal means connected to the excitation circuit of said generator for modifying said regulating signal, said stabilizing signal means including means for deriving a regenerative signal component responsive to the rate of change of the excitation current of said machine, phase advancing means for further modifying said regulating signal, and means responsive to the last modified signal for affecting the excitation of said machine.

15. A regulating system for a synchronous dynamoelectric machine comprising, means responsive to the armature voltage of said machine for deriving an electrical regulating signal, means including a stabilizing signal derived from the excitation circuit of said machine and responsive to a rotational transient condition of said machine for modifying said regulating signal, means for advancing the phase of said modified signal, and means responsive to the phase advanced modified signal for varying the excitation of said machine so as to maintain said armature voltage at a predetermined value and maintain the load stability of said machine.

16. A system for regulating the voltage and increasing the stability of a synchronous dynamoelectric machine having a stator and a rotor and provided with armature and excitation windings, comprising means for deriving from said armature winding a regulating signal responsive to variations in the armature voltage of said machine, means for deriving from said excitation winding a stabilizing signal responsive to a rotational transient condition of the rotor of said machine, means connected to said deriving means for combining said regulating signal and said stabilizing signal for modifying said regulating signal, means connected to said combining means for advancing the time phase of said modified signal, and means connected to said last named means for controlling the energization of said excitation winding in response to said phase advanced signal.

17. A regulating system for regulating the voltage and increasing the stability of a synchronous dynamoelectric machine having a stator and a rotor and having armature and field windings and provided with an excitation means for the field winding, comprising means for deriving from said armature winding a regulating signal voltage responsive to variations in the armature voltage of said machine, means for deriving from said excitation means a stabilizing signal voltage responsive to variations in the excitation of said machine, means connected to said deriving means for combining said regulating signal voltage and said stabilizing signal voltage to produce a modified regulating signal voltage, means connected to said last named means for advancing the phase of said modified regulating signal voltage to offset the effects of the inductive reactance in the regulating system thereby to speed up the operation of said excitation means, and means connected to said last named means for controlling said excitation means in response to said phase advanced regulating signal voltage.

18. A voltage regulating system for a synchronous dynamoelectric machine comprising, means for deriving a voltage which varies responsively to variations in the armature voltage of said machine, connections to a source of reference voltage for providing a regulating signal equal to the difference between said first voltage and said reference voltage, machine load stabilizing signal means responsive to a rotor rotational transient condition of said machine connected for modifying said regulating signal, said stabilizing signal means including a potentiometer resistor connected to be energized by the excitation voltage of said machine, a transformer having a winding serially connected in the excitation circuit of said machine, and a capacitor and a resistor connected in shunt with a portion of said potentiometer resistor, means for advancing the phase of said modified regulating signal, and means responsive to the phase advanced modified signal for varying the excitation of said machine so as to regulate the voltage and load stability of said machine.

19. A regulating system for regulating the voltage and increasing the stability of a synchronous generator having a stator and a rotor and provided with armature and field windings and with an excitation means for the field winding, comprising means for deriving from said armature winding a regulating signal voltage responsive to variations in the armature voltage of said generator, means for deriving from said excitation means a stabilizing signal voltage responsive to the rates of change of the voltage and current supplied to the said field winding, means connected to said deriving means for combining said regulating signal voltage and said stabilizing signal voltage to produce a modified regulating signal voltage, means connected to said last named means for advancing the phase of said modified regulating signal voltage to offset the effects of inductive reactance in said excitation means thereby to speed up the operation of said excitation means, and means connected to said last named means for controlling said excitation means in response to said phase advanced regulating signal voltage.

20. A voltage regulating system for a synchronous dynamoelectric machine comprising, means responsive to the armature voltage of said machine for deriving a first voltage, connections to a source of reference voltage for providing a regulating signal equal to the difference between said first voltage and said reference voltage, stabilizing signal means responsive to a rotor angular transient condition of said machine connected for modifying said regulating signal, said stabilizing signal means including a potentiometer resistor connected to be energized by the excitation voltage of said machine, a transformer having a winding serially connected in the excitation circuit of said machine, a resistor serially connected in the excitation circuit of said machine, and a capacitor and a second resistor connected in shunt with said first resistor and a portion of said potentiometer, means for modifying the phase angle of said modified regulating signal, and means responsive to the last modified signal for varying the excitation of said machine so as to maintain said armature voltage at a predetermined value and maintain the load stability of said machine.

21. A voltage regulating system for a synchronous generator which is arranged for interconnection in a power system comprising, rectifier means responsive to the armature voltage of said generator for deriving a first voltage, connections between said rectifier means and a source of reference voltage for providing a voltage regulating signal equal to the difference between said first voltage and said reference voltage, generator load stabilizing signal means responsive to a rotor rotational transient condition of said machine, comprising a first potentiometer resistor connected to be energized by the excitation voltage of said generator, a transformer having two windings, a fixed resistor, one winding of said transformer and said resistor being serially connected in the excitation circuit of said generator, one terminal of said resistor being connected to one terminal of said first potentiometer resistor, a second potentiometer resistor and a capacitor connected in shunt with said fixed resistor and a portion of said potentiometer resistor, and a connection between the slider of said second potentiometer resistor and one terminal of the second winding of said transformer whereby a load stabilizing signal is derived between the other terminal of said second winding and the junction of said first winding and said fixed resistor, means responsive to said load stabilizing signal for modifying said regulating signal, frequency responsive network means for modifying the phase of said regulating signal so as to provide a phase advancing characteristic in the range of frequencies including the system oscillation frequencies of said power system and a phase angle retarding characteristic at frequencies below this range, and means responsive to the doubly modified signal for varying the excitation of said generator so as to regulate the voltage and load stability of said generator.

22. A regulating system for a dynamoelectric machine, comprising, means for deriving an electrical signal which varies responsively to variations in the armature voltage of said machine, means connected to the armature circuit of said machine for deriving a stabilizing signal for modifying said first signal, means for modifying the phase of said modified signal, and means responsive to the last modified signal for controlling the excitation of said machine.

23. A voltage regulating system for a synchronous dynamoelectric machine comprising, means for deriving a voltage which varies responsively to variations in the armature voltage of said machine, connections to a source of reference voltage for providing a regulating signal responsive to the difference between said first voltage and said reference voltage, stabilizing signal means derived from the electrical output of said machine connected for modifying said regulating signal, phase advancing means connected for further modifying said regulating signal, and means responsive to the phase advanced modified signal for controlling the excitation of said machine.

24. A system for regulating the voltage and increasing the stability of a dynamoelectric machine having a stator and a rotor and provided with armature and excitation windings, comprising means for deriving from said armature winding a regulating signal responsive to variations in the armature voltage of said machine, means connected to said armature for deriving a stabilizing signal, means for combining said stabilizing signal and said regulating signal for modifying said regulating signal, means connected to said combining means for advancing the time phase of said modified signal, and means connected to said last named means for controlling the energization of said excitation winding in response to said phase advanced signal.

25. A regulating system for a dynamoelectric machine comprising, means responsive to the armature voltage of said machine for deriving an electrical signal, stabilizing signal means responsive to the armature power of said machine for modifying said signal, means for modifying the phase of said modified signal, and means responsive to the last modified signal for varying the excitation of said machine so as to maintain said armature voltage at a predetermined value and maintain the load stability of said machine.

26. A voltage regulating system for a synchronous dynamoelectric machine comprising, means responsive to variations in the armature voltage of said machine for deriving a first voltage, connections to a source of reference voltage for providing a regulating signal responsive to the difference between said first voltage and said reference voltage, stabilizing signal means responsive to a rotor rotational transient condition of said machine for modifying said regulating signal, said stabilizing signal means including means for deriving a voltage signal which varies responsively to the variations in the component of the armature current of said machine which is in phase with the armature voltage thereof, phase advancing means for further modifying said regulating signal, and means responsive to the last modified signal for varying the excitation of said machine so as to maintain said armature voltage at a predetermined value and maintain load stability of said machine.

27. A voltage regulating system for a synchronous dynamoelectric machine comprising, means for deriving a voltage which varies responsively to variations in the armature voltage of said machine, connections to a source of reference voltage for providing a regulating signal responsive to the difference between said first voltage and said reference voltage, stabilizing signal means responsive to a rotor rotational transient condition of said machine for modifying said regulating signal, said stabilizing signal means including a current transformer connected in one armature conductor of said machine, a potential transformer connected to indicate a voltage in phase with the current in said conductor at unity power factor, and a plurality of electron discharge devices connected to said transformers for providing a stabilizing signal voltage which varies approximately proportionally with the component of the current in said line which is in phase with the voltage output of said second transformer, phase advancing means for further modifying said regulating signal, and means responsive to the phase advanced modified signal for controlling the excitation of said machine.

28. A voltage regulating system for a synchronous dynamoelectric machine comprising, means responsive to variations in the armature voltage of said machine for deriving a first voltage, connections to a source of reference voltage for providing a regulating signal responsive to the difference between said first voltage and said reference voltage, stabilizing signal means responsive to a rotor rotational transient condition of said machine for modifying said regulating signal, said stabilizing signal means including means for positioning a shaft responsively to the armature power of said machine and means for deriving a voltage signal responsive to movements of said shaft, phase advancing means for further modifying said regulating signal, and means responsive to the last modified signal for controlling the excitation of said machine.

29. A voltage regulating system for a synchonous dynamoelectric machine comprising, means for deriving a voltage which varies responsively to variations in the armature voltage of said machine, connections to a source of reference voltage for providing a regulating signal responsive to the difference between said first voltage and said reference voltage, stabilizing signal means responsive to a rotor rotational transient condition of said machine for modifying said regulating signal, said stabilizing signal means comprising wattmeter means responsive to the current and voltage output of said machine for rotatably positioning a shaft, an armature of magnetizable material connected to said shaft and having a winding thereon, and a permanent magnet for providing a magnetic field in which said armature is positioned whereby a voltage is generated in said winding which is responsive in sense and magnitude to the direction and amount of rotation of said shaft, phase advancing means connected for further modifying said signal, and means responsive to the phase advanced modified signal for controlling the excitation of said machine.

30. A system for regulating the voltage and increasing the stability of a dynamoelectric machine having a stator and a rotor and provided with an armature winding and an excitation winding, comprising means for deriving from said armature winding a regulating signal responsive to variations in the armature voltage of said machine, stabilizing signal means responsive to transient changes in the speed of said rotor and connected to said deriving means for modifying said regulating signal, means connected to said deriving means for advancing the phase of said modified signal, and means connected to said last named means for controlling the energization of said excitation winding in response to said phase advanced signal.

31. A regulating system for a synchronous dynamoelectric machine comprising, means responsive to the armature voltage of said machine for deriving an electrical signal, stabilizing signal means responsive to momentary deviations in the speed of said machine connected for modifying said electrical signal, means for modifying the phase of said modified signal, and means responsive to the last modified signal for varying the excitation of said machine so as to maintain said armature voltage at a predetermined value and maintain load stability of said machine.

32. A voltage regulating system for a synchronous dynamoelectric machine comprising, means for deriving a voltage which varies responsively to variations in the armature voltage of said machine, connections to a source of reference voltage for providing a regulating signal responsive to the difference between said first voltage and said reference voltage, stabilizing signal means responsive to momentary deviations in the speed of said machine from its normal synchronous speed connected for modifying said regulating signal, phase advancing means for further modifying said regulating signal, and means responsive to the last modified regulating signal for controlling the excitation of said machine.

33. A voltage regulating system for a synchronous dynamoelectric machine comprising, means responsive to variations in the armature voltage of said machine for deriving a first voltage, means connecting said first voltage to a source of reference voltage for providing a regulating signal responsive to the difference between said first voltage and said reference voltage, stabilizing signal means responsive to a rotor rotational transient condition of said machine for modifying said regulating signal, said stabilizing signal means including a tachometer generator connected to the rotor of said dynamoelectric machine for deriving a voltage signal which varies responsively to deviations in the speed of said machine from its synchronous speed, means for modifying the phase angle of said modified signal, and means responsive to the last modified signal for varying the excitation of said machine so as to maintain said armature voltage at a predetermined value and maintain the load stability of said machine.

34. A voltage regulating system for a synchronous dynamoelectric machine comprising, means for deriving a voltage which varies responsively to variations in the armature voltage of said machine, connections to a source of reference voltage for providing a regulating signal responsive to the difference between said first voltage and said reference voltage, stabilizing signal means for modifying said regulating signal, said stabilizing signal means including a tachometer generator connected to the rotor of said synchronous dynamoelectric machine for deriving a unidirectional voltage which varies approximately proportionately with the speed of said machine, a first potentiometer connected for energization by said tachometer voltage, a source of unidirectional reference voltage, a second potentiometer connected for energization by said unidirectional reference voltage, said potentiometers being arranged with the sliders thereof balanced to produce zero potential therebetween at the normal synchronous speed of said machine whereby a voltage signal responsive in sense and magnitude to the deviation of the speed of said machine from said synchronous speed appears between said two sliders, phase angle advancing means for further modifying said signal, and means responsive to the modified signal for affecting the excitation of said machine.

35. A voltage regulating system for a synchronous dynamoelectric machine comprising, means responsive to variations in the armature voltage of said machine for deriving a first voltage, connections to a source of reference voltage for providing a regulating signal responsive to the difference between said first voltage and said reference voltage, stabilizing signal means responsive to the load angle of said machine connected for modifying said regulating signal, means for modifying the phase of said modified signal, and means responsive to the last modified signal for varying the excitation of said machine so as to maintain said armature voltage at a predetermined value and maintain the load stability of said machine.

36. A voltage regulating system for a synchronous generator connected to supply energy to a power system comprising, means for deriving a voltage which varies responsively to the variations in the armature voltage of said generator, connections to a source of reference voltage for providing a regulating signal responsive to the difference between said first voltage and said reference voltage, stabilizing signal means for modifying said regulating signal, said stabilizing signal means comprising potential transformer means for deriving a first signal voltage component approximately proportional to the terminal voltage of said generator, current transformer means for deriving a voltage approximately proportional to the armature current of said generator and impedance means connected to be energized by the last named voltage whereby a voltage drop is produced across said impedance means which provides a second signal voltage component, and means including amplifier and discriminator circuit means for combining said two voltage signal components to provide a stabilizing signal voltage which is responsive in sense and magnitude to changes in the load angle of said generator, phase angle advancing means for further modifying said signal, and means responsive to the modified signal for controlling the excitation of said generator.

References Cited in the file of this patent
UNITED STATES PATENTS

| Number | Name | Date |
|---|---|---|
| 2,303,229 | Park | Nov. 24, 1942 |
| 2,383,306 | Hanna et al. | Aug. 21, 1945 |